United States Patent
Ishizaki et al.

(10) Patent No.: US 6,728,613 B2
(45) Date of Patent: Apr. 27, 2004

(54) COLLISION JUDGING SYSTEM

(75) Inventors: Tatsuya Ishizaki, Wako (JP); Kazuo Matsuda, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 59 days.

(21) Appl. No.: 10/223,884

(22) Filed: Aug. 19, 2002

(65) Prior Publication Data
US 2003/0114985 A1 Jun. 19, 2003

(30) Foreign Application Priority Data
Sep. 3, 2001 (JP) ........................... 2001-265398

(51) Int. Cl.[7] .................. G06F 7/00; B60R 22/00; E05F 15/00; B60Q 1/00; B60K 28/10
(52) U.S. Cl. .................. 701/36; 701/45; 701/46; 701/47; 340/436; 340/438; 340/3.43; 340/3.44; 180/274; 180/282; 280/735
(58) Field of Search ............ 701/36, 45, 46, 701/47; 340/436, 438, 3.43, 3.44; 180/274, 282; 280/735

(56) References Cited

U.S. PATENT DOCUMENTS

| | | | | |
|---|---|---|---|---|
| 4,864,531 A | * | 9/1989 | Quatse et al. ........... 714/52 |
| 5,847,472 A | * | 12/1998 | Byon ................. 307/10.1 |
| 5,897,599 A | * | 4/1999 | Takeuchi ............. 701/46 |
| 6,209,674 B1 | * | 4/2001 | Buhring .............. 180/282 |
| 6,229,437 B1 | * | 5/2001 | Schmid et al. ......... 340/438 |
| 6,345,220 B1 | | 2/2002 | Ikegami .............. 701/45 |
| 6,629,032 B2 | * | 9/2003 | Akiyama ............. 701/48 |
| 6,643,574 B1 | * | 11/2003 | Swart et al. .......... 701/45 |

FOREIGN PATENT DOCUMENTS

| | | |
|---|---|---|
| DE | 39 38 777 A1 | 5/1991 |
| DE | 198 13 123 A1 | 10/1999 |
| DE | 198 23 920 C1 | 11/1999 |
| DE | 199 63 267 A1 | 7/2000 |
| DE | 100 04 281 A1 | 8/2001 |
| GB | 2 238 416 A | 5/1991 |
| JP | 2001-80545 | 3/2001 |

* cited by examiner

*Primary Examiner*—William A. Cuchlinski, Jr.
*Assistant Examiner*—Brian J. Broadhead
(74) *Attorney, Agent, or Firm*—Merchant & Gould, P.C.

(57) ABSTRACT

The error determination section determines whether or not an acceleration data set has been received properly with no error. Received data memories store a plurality of the received acceleration data sets. Collision judgment control unit judges a possibility of a collision on the basis of a latest error-free proper data of the received acceleration data sets stored in the received data memories. Further, in case of occurrence of a data deficiency, an error-free proper data set is constantly stored in memory.

10 Claims, 10 Drawing Sheets

COLLISION JUDGING SYSTEM

FIELD OF THE INVENTION

The present invention relates generally to collision judging systems, and more specifically to an improved collision judging system which is particularly suitable for use with, for example, a hood actuating apparatus of a vehicle to protect pedestrians.

BACKGROUND OF THE INVENTION

Among examples of the conventional collision judging systems is one disclosed in Japanese Patent Laid-Open Publication No. 2001-80545, which is used with a hood actuating apparatus of a vehicle. FIG. 10 hereof schematically shows the disclosed collision judging system, which includes a vehicle speed sensor 101 for detecting a traveling speed of the vehicle 100, at least one acceleration sensor 103 for detecting acceleration produced by an external force acting on a bumper 102 from ahead of the vehicle 100, a deformation rate calculation section 104 for calculating a deformation rate of the bumper 102 on the basis of the acceleration detected by the acceleration sensor 103, and a smoothing section 105. The disclosed collision judging system also includes a vehicle-speed-vs-threshold map 106 for varying a threshold value of the bumper deformation rate in accordance with the detected vehicle speed, a hood actuator 108 for flipping up the hood 109 by a predetermined amount, and a control section 107 for controlling the operation of the hood actuator 108. Once the calculated bumper deformation rate exceeds a predetermined threshold value while the vehicle speed detected by the speed sensor 101 is over a predetermined speed value, the control section 107 determines that the vehicle 100 hits a certain external object (e.g., a pedestrian) M considered to be one of predetermined external objects to be protected from a collision against the vehicle, and then it causes the hood actuator 108 to flip up the hood 109. Thus flipping up the hood 109 via the hood actuator 108 can significantly lessen an impact when the external object M collides against the hood 109.

In such a collision judging system, the acceleration sensor 103 is provided at a front end of the vehicle, while the control section 107, which receives acceleration data and makes a collision judgment, is provided within a vehicle compartment because the control section 107 is in the form of a high-precision electronic control unit (ECU) to be installed in a good operating environment. Therefore, the acceleration sensor 103 has to be connected to the control section 107 via a relatively long signal transmission path; the relatively long signal transmission path would lead to a higher possibility that unwanted electrical noises, such as electromagnetic wave and static electricity, are introduced in the acceleration data transmitted from the acceleration sensor 103 to the control section 107. The electrical noises sometimes prevent the acceleration data from being properly received by the control section 107. As one measure to cope with such electric noises, it has been known to interconnect the acceleration sensor 103 and control section 107 via a serial communication line and use a particular data format, where a check code, such as a parity bit, is inserted before or behind the acceleration data indicative of the sensor-detected acceleration, to permit reliable determination as to whether the acceleration data set has been properly received by the control section 107; this anti-noise measure may more or less contribute to improved communication reliability.

However, with the above-discussed conventional collision judging technique, the acceleration data having been prevented from being properly received by the control section 107 is not used at all in the collision judgment, i.e. no collision judgment is made at all with respect to the acceleration data received improperly during a vehicle collision, and the collision judgment is made only on the basis of subsequent acceleration data properly received by the control section 107. As a consequence, the convention collision judging technique would present very poor collision judging performance. Further, the collision judgment tends to be made intermittently due to the improper reception of the acceleration data, which would also lead to poor collision judging performance

SUMMARY OF THE INVENTION

In view of the foregoing prior art problems, it is an object of the present invention to provide an improved collision judging system which achieves enhanced collision judging performance by allowing acceleration data to be successively input to a control section so that the control section can make collision judgment with no unwanted intermission and achieves enhanced collision judging performance.

According to an aspect of the present invention, there is provided a collision judging system which comprises: a sensor unit that includes: an acceleration sensor for detecting acceleration; a data conversion section for converting the acceleration, detected by the acceleration sensor, into an acceleration data set including a check code; and a transmission section for transmitting the acceleration data set converted by the data conversion section; a received data control unit that includes: a reception section for receiving the acceleration data set transmitted from the transmission section of the sensor unit; an error (e.g., data deficiency or shortage) determination section for determining, with reference to the check code included in the acceleration data set, whether or not the acceleration data set has been received properly from the transmission section via the reception section, and outputting the received acceleration data set as a proper data set when it is determined that the acceleration data set has been received properly with no error involved but as an erroneous data set when it is determined that the acceleration data set has not been received properly; and a first storage section for storing a plurality of the acceleration data sets output by the error (data deficiency) determination section; and a collision judgment control unit for making a collision judgment on the basis of a latest proper data set of the plurality of the acceleration data sets stored in the first storage section.

In the collision judging system of the present invention, acceleration values detected successively by the acceleration sensor are each converted into an acceleration data set including a check code, and then the received data control unit determines, on the basis of the check code, whether or not the acceleration data set has been received properly with no error. Each acceleration data set determined as having been received properly is classified as an error-free normal or proper acceleration data set while each acceleration data set determined as not having been received properly is classified as an erroneous acceleration data set, and a predetermined plurality of these classified acceleration data sets are stored in the first storage section. With such arrangements, the present invention can significantly enhance the reliability of data communication between the sensor unit and a controller unit (e.g., an ECU: Electronic Control Unit). Further, because a plurality of the acceleration data sets received in succession are stored in advance for each collision judgment and the collision judgment is made on the basis of the latest proper data set of the stored acceleration data sets, the present invention can make the collision judgment successively with no interruption or intermission.

The collision judgment control unit may include a second storage section for storing the latest proper data set of the plurality of the acceleration data sets stored in the first storage section. When the collision judgment control unit has made an error determination that all of the plurality of the acceleration data sets stored in the first storage section are erroneous data sets, the collision judgment control unit may make the collision judgment on the basis of the proper data set stored in the second storage section. In this embodiment, when the collision judgment control unit has determined, with reference to the received acceleration data sets stored in the first storage section, that all of the acceleration data sets having been received for a predetermined time period up to a current time point are erroneous data sets, it judges that some data deficiencies have occurred in the received data sets, in which case it makes the collision judgment on the on the basis of the proper data set stored in the second storage section. With such arrangements, even when the received data sets have been determined as erroneous data sets in succession, the present invention can make the collision judgment successively with no interruption and can reliably prevent deterioration of the collision judging performance.

The collision judgment control unit may further include a compensating-value calculation section for calculating a predetermined compensating value on the basis of the proper data set stored in the second storage section, a post-determination proper data set input after termination of the error (data deficiency) determination and the number of times the error determination has been made. In this case, when the post-determination proper data set is input immediately after the error determination has been made by the collision judgment control unit at least once, the collision judgment control unit uses, in the collision judgment, a value obtained by adding the compensating value to an acceleration value represented by the post-determination proper data set. Namely, because, in this case, the collision judgment control unit calculates a compensating value on the basis of the proper data set stored in the second storage section, the post-determination proper data set input after termination of the error determination and the number of times the error determination has been made and then makes the collision judgment using the thus-calculated compensating value, it is possible to minimize the deterioration of the collision judging performance.

Preferably, the compensating-value calculation section calculates the compensating value in accordance with a mathematical expression of $(B-A)N/2$, where A represents the proper data set stored in the second storage section, B represents the post-determination proper data set, and N represents the number of times the error determination has been made.

Preferably, the collision judgment control unit includes a detected data output section for outputting, as a detected acceleration data set, the latest proper data set of the plurality of the received acceleration data sets stored in the first storage section, a collision-judging-value calculation section for adding respective acceleration values represented by a plurality of the detected acceleration data sets output from the detected data output section and thereby outputting, as a collision judging value, a resultant sum of the acceleration values represented by the detected acceleration data sets, and a comparison section for comparing the collision judging value to a preset collision-judging threshold value. Because, in this case, the acceleration values represented by the detected acceleration data sets output from the detected data output section are added together to calculate the collision judging value and the collision judgment is made by comparing the thus-calculated collision judging value to the preset collision-judging threshold value, the present invention can make the collision judgment with enhanced reliability.

In one embodiment, the second storage section of the collision judgment control unit stores the detected acceleration data set. In this case, when the detected data output section has made an error determination that all of the plurality of the acceleration data sets stored in the first storage section are erroneous data sets, i.e. have data deficiencies, the collision-judging-value calculation section uses, as substitute data, the detected acceleration data set stored in the second storage section to calculate a collision judging value; here, the collision judging value is calculated by adding together the respective acceleration values represented by a plurality of the detected acceleration data sets including the substitute data. With the arrangement that, when it is determined that some data deficiencies have occurred in the acceleration data sets stored in the first storage section, the collision-judging-value calculation section calculates the collision judging value is calculated by adding together the respective acceleration values represented by a plurality of the detected acceleration data sets including the detected acceleration data set stored in the second storage section, the present invention can prevent deterioration of the collision judging performance.

The collision-judging-value calculation section may further include a compensating-value calculation section for calculating a predetermined compensating value on the basis of the detected acceleration data set stored in the second storage section, an post-determination detected acceleration data set input after termination of the error determination and the number of times the error determination has been made. In this case, when the post-determination detected acceleration data set is input immediately after the error determination has been made by the collision judgment control unit at least once, the collision judgment control unit outputs the collision judging value calculated by adding respective acceleration values represented by a plurality of the detected acceleration data sets that include an acceleration value obtained by adding the compensating value to the acceleration value represented by the post-determination detected acceleration data set. By thus using the compensating value when a proper data set has been input after a plurality of data deficiencies occurred in succession, the present invention can prevent deterioration of the collision judging performance with further enhanced reliability.

The compensating-value calculation section may calculate the compensating value in accordance with a mathematical expression of $(B-A)N/2$, where A represents the detected acceleration data set stored in the second storage section, B represents the post-determination detected acceleration data set, and N represents the number of times the error determination has been made.

Preferably, the reception section receives an acceleration data set from the transmission section in each predetermined reception cycle, and the detected data output section outputs, as the detected acceleration data set, the latest proper data set of the plurality of the received acceleration data sets stored in the first storage section, in each operating cycle set to an integral multiple of the predetermined reception cycle.

Further, in the collision judging system of the invention, the sensor unit is suitably provided on a deformable member in a front end portion of a vehicle, so as to judge a possibility of a collision with a certain external object at the front of the vehicle. The sensor unit may also be provided in left and right sides of the vehicle.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

It should be appreciated that various construction, shapes, positions, numerical values, etc. to be referred to in the following description are, in all aspects, just for illustrative purposes. Therefore, the present invention should never be construed as restricted to embodiments to be described hereinbelow, and it may be modified variously without departing from the scope defined by the appended claims.

Figure 1:
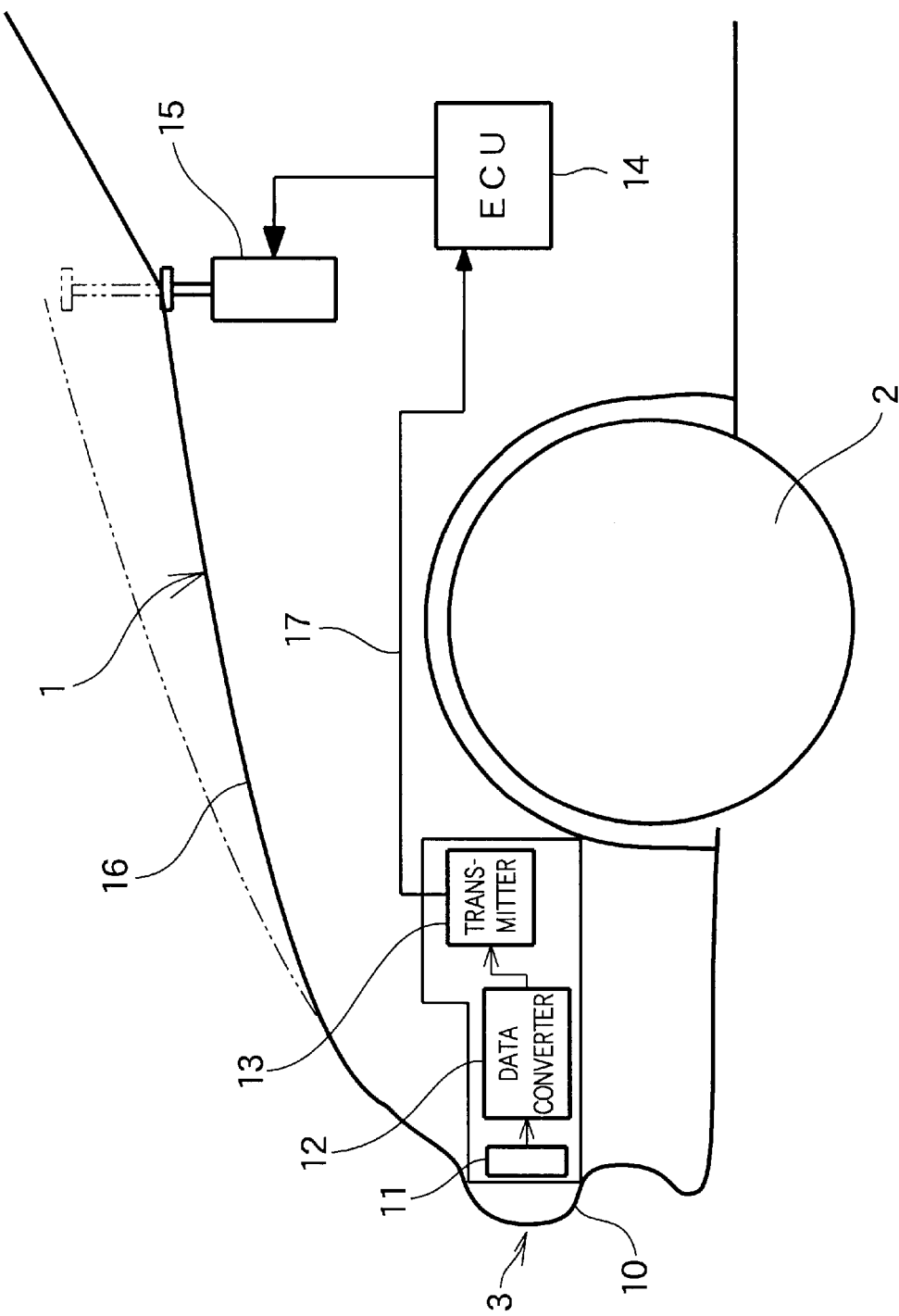
FIG. 1 is a block diagram showing an exemplary general setup of a collision judging system in accordance with an embodiment of the present invention.

FIG. 1 is a block diagram showing an exemplary general setup of a collision judging system in accordance with an embodiment of the present invention. In the figure, reference numeral 1 represents a front part of a vehicle, and 2 represents a front wheel of the vehicle. In a front end portion 3 of the vehicle, there is provided a sensor unit 10 that includes at least one acceleration sensor 11, a data conversion section 12 for converting a value of each acceleration, detected via the acceleration sensor 11, into a set of digital acceleration data (i.e., an acceleration data set) having incorporated therein a parity check code and a transmission section 13 for transmitting the thus-converted data set. Note that the acceleration detected by the acceleration sensor 11 is one caused by an external force acting on a vehicle bumper from ahead of the vehicle and the term "acceleration" as used in the context of the present invention never means acceleration produced during ordinary travel of the vehicle. Although, in practice, a plurality of acceleration sensors are employed in the sensor unit 10, the instant embodiment will be described hereinbelow as employing one acceleration sensor 11 to facilitate understanding. This sensor unit 10 is connected via a signal line or communication cable 17 with an ECU (electronic control unit) 14 so that serial communication can be performed between the sensor unit 10 and the ECU 14. Note that the sensor unit 10 and ECU 14 may be interconnected via any other suitable means than the wired communication, such as wireless communication.

In practice, the data conversion section 12 and transmission section 13 in the sensor unit 10 are implemented by a communication IC (Integrated Circuit). Thus, the sensor unit 10 is actually fabricated as a unit of a match box size, by accommodating the acceleration sensor 11 and communication IC together in a resin-made case.

The ECU 14 controls operation of a hood actuator 15 for raising/lowering a hood 16 of the vehicle. Namely, the vehicle hood 16 can be automatically flipped up by the hood actuator 15, as denoted by a phantom line in the figure. The ECU 14 judges a possibility of a collision of the vehicle (i.e., makes a collision judgment) on the basis of the acceleration data sets received from the acceleration sensor 11. When the ECU 14 determines that the front end portion 3 has collided with a certain external object, it activates the hood actuator 15 to flip up the vehicle hood 16 to a predetermined position. Thus flipping up the hood 16 can significantly lessen a secondary collision impact occurring between the certain external object and the vehicle hood 16.

The transmission section 13 transmits, to the ECU 14, the coded acceleration data set including the parity bit which represents the acceleration detected via the acceleration sensor 11. For example, the coded acceleration data set comprises a total of six bits: five-bit acceleration data and one-bit parity check code. Specifically, the five-bit acceleration data represents the sensor-detected acceleration value in a binary number of five digits. The parity check code (parity bit) is set at a value "0" when an even number of "1" bits are included in the binary number of the acceleration data, but at a value "1" when an odd number of "1" bits are included in the binary number of the acceleration data. Whereas the instant embodiment is described in relation to the five-bit acceleration data and one-bit parity check code, the numbers of the bits constituting such acceleration data and parity check code are not necessarily so limited. Specific relationship between the sensor-detected acceleration value and the coded acceleration data set will be later described. The following paragraphs describe how the acceleration caused by a vehicle collision is detected in the instant embodiment.

Figure 2:
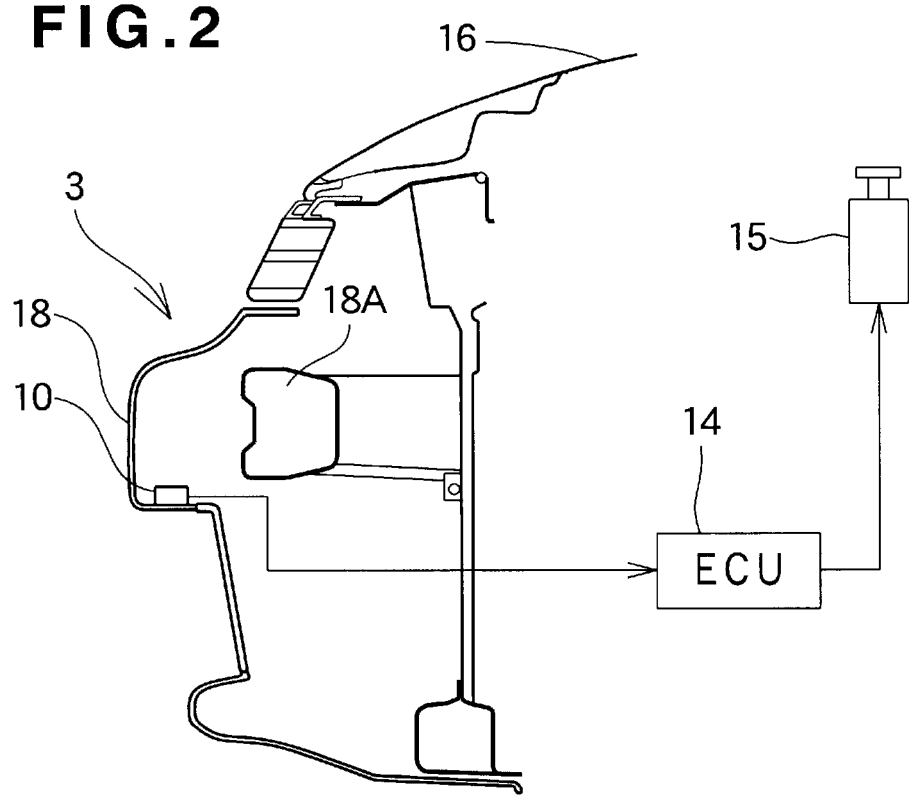
FIG. 2 is a sectional side view of a vehicle's front end portion having a sensor unit incorporated therein, which shows the front end portion in a normal state, i.e. when the front end portion is not colliding with any external object.
Figure 3:
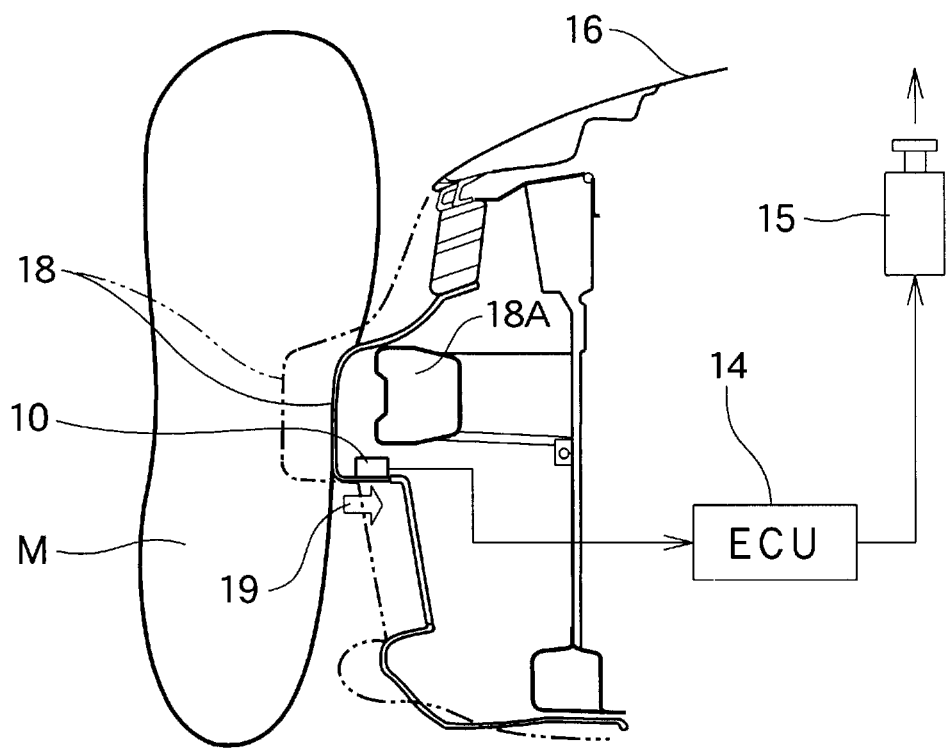
FIG. 3 is a sectional side view of the vehicle's front end portion when the front end portion has collided with an external object.

FIGS. 2 and 3 are sectional side views of the vehicle's front end portion 3 where is provided the sensor unit 10. Specifically, FIG. 2 shows the front end portion 3 in a normal state, i.e. when the front end portion 3 is not colliding with any external object. As shown in the figure, the sensor unit 10, including the acceleration sensor 11, data conversion section 12 and transmission section 13, is disposed inwardly of a bumper face 18 covering a fore portion of a front bumper 18A in the front end portion 3. The acceleration sensor 11 is preferably in the form of a well-known electrostatic-capacitance-type acceleration detecting element and an associated electric circuit. A weight is provided within the acceleration detecting element. FIG. 3 shows the vehicle's front end portion 3 when the front end portion 3 has collided with a certain external object M, where a phantom line represents a position of the bumper face 18 before the occurrence of the vehicle collision. As the bumper face 18 is displaced rightward in FIG. 3 (toward the rear of the vehicle) due to the collision with the external object M, the weight within the acceleration detecting element moves forward, by inertia opposite in direction to the acceleration 19 caused by the rearward displacement of the bumper face 18 due to the collision. Change in electrostatic capacitance induced by such forward movement of the weight is extracted by the electric circuit and set as an acceleration value.

The acceleration sensor 11 detects the acceleration, caused by the rearward displacement of the bumper face 18, on the basis of the electrostatic capacitance change induced by the forward movement of the weight. Because the acceleration of the bumper face 18 displaced due to the vehicle collision is detected as stated above, there is no need to provide a great number of acceleration sensors along the entire length of a frontal region of the bumper face 18 extending in a widthwise direction of the vehicle (i.e., along the entire frontage of the bumper face 18), in contrast to load sensors that are designed to directly detect the load applied by the collision. Namely, in the instant embodiment, it is only necessary to provide two or three acceleration sensors at predetermined intervals along the frontage of the bumper face 18. In the case where a plurality of the acceleration sensors are provided, the ECU 14 may also calculate an average of respective acceleration values output from the acceleration sensors and control the hood actuator 15 on the basis of the thus-calculated average acceleration value. Further, the acceleration sensor 11 may be mounted on a bracket, rather than directly on the bumper face, as long as the bracket is deformable similarly to the bumper face 18.

Further, whereas the instant embodiment has been described above as providing the sensor unit 10, including the acceleration sensor 11 etc., in the vehicle's front end portion 3, such a sensor unit may also be provided in left and right sides and back of the vehicle so as to judge a possibility of a collision with an external object at any one of the front, left and right sides and back of the vehicle.

Figure 4:
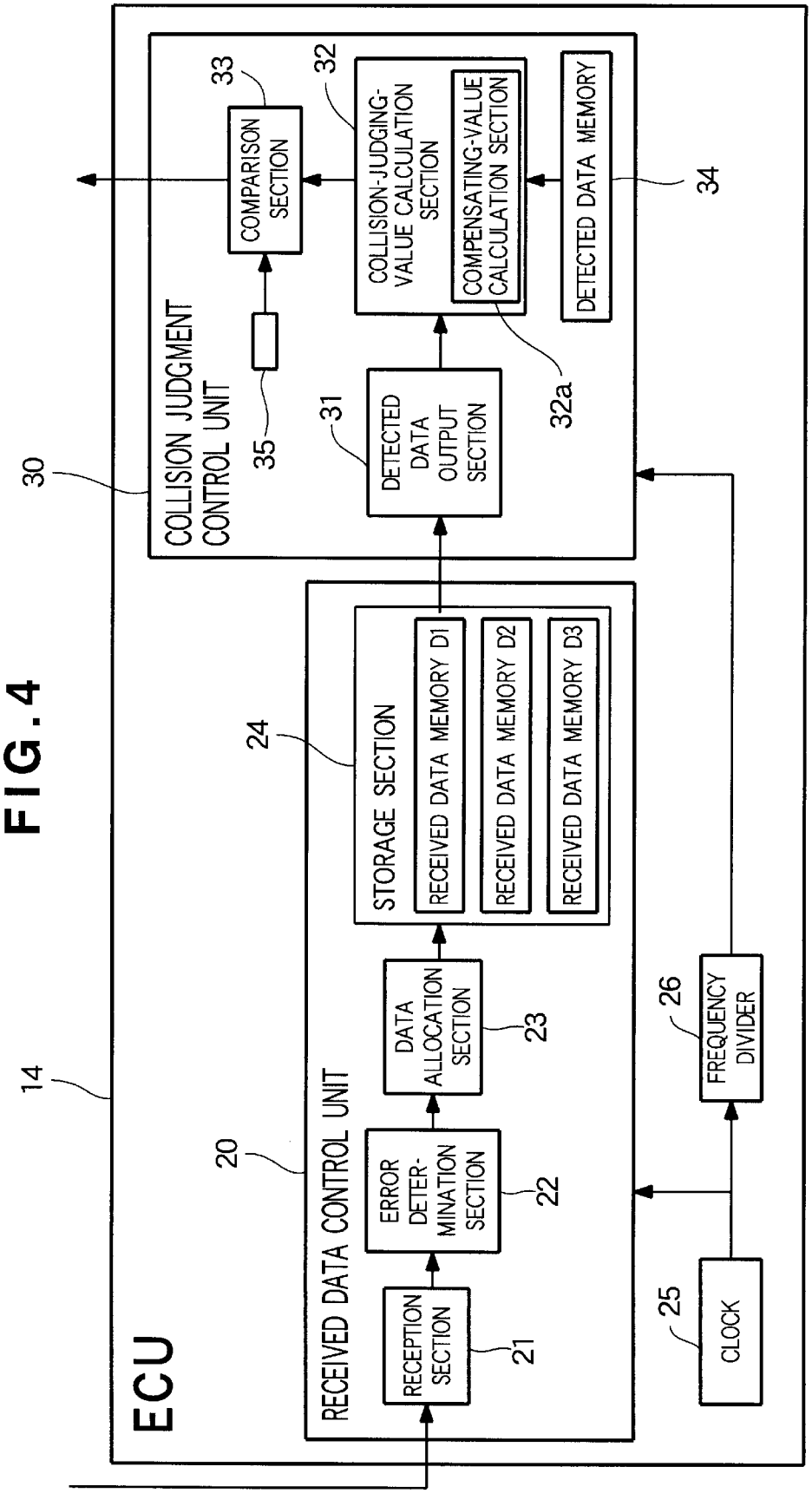
FIG. 4 is a block diagram showing principal components of an ECU in the collision judging system of the invention.

FIG. 4 is a block diagram showing principal components of the ECU 14 in the collision judging system of FIG. 1. The ECU 14 includes a received data control unit 20 for receiving each acceleration data set from the sensor unit 10, determining whether or not the acceleration data set has been received properly with no error from the sensor unit 10, and storing last three acceleration data sets. The ECU 14 further includes a collision judgment control unit 30 for judging a possibility of a vehicle collision on the basis of the acceleration data sets stored in the received data control unit 20, a clock 25, and a frequency divider 26.

The clock 25 generates clock pulses, one clock pulse every 200 μsec. The frequency divider 26 connected to the clock is designed to output one pulse every five clock pulses output from the clock 25. The received data control unit 20 operates in synchronism with each clock pulse output from the clock 25, while the collision judgment control unit 30 operates in synchronism with each output pulse from the frequency divider 26. Namely, the collision judgment control unit 30 operates once every five operations of the received data control unit 20; in other words, the collision judgment control unit 30 operates in an operating cycle five times longer than the received data control unit 20.

Specifically, the received data control unit 20 includes a reception section 21, an error determination section 22, a data allocation section 23, and a storage section 24 having received data memories D1, D2 and D3. The reception section 21 receives the acceleration data sets transmitted successively from the transmission section 13 of the sensor unit 10 and the successive received acceleration data sets are passed via the reception section 21 to the error determination section 22, where a determination is made, for each of the received acceleration data sets, as to whether the acceleration data set has been received properly from the sensor unit 10. If it is determined, by reference to the parity bit, that the acceleration data set has been received properly, the error determination section 22 outputs the received acceleration data set as an error-free proper data set, but if not, the error determination section 22 outputs the received acceleration data set as an erroneous data set.

The received data memories D1, D2 and D3 are provided for storing three successive received acceleration data sets each including acceleration data and a data discrimination bit indicative of whether the received acceleration data set is an error-free proper data set or erroneous data set. Detected acceleration data output section 31 of the collision judgment control unit 30, as will be later described, refers to the data discrimination bit to output the latest proper data set as a "detected acceleration data set". The data discrimination data is, for example, one-bit data that may be set at a value "0" to indicate that the data set in question is a proper data set or at a value "1" to indicate that the data set in question is an erroneous data set.

The data allocation section 23 relocates the received acceleration data sets stored in the received data memories D1, D2 and D3 of the storage section 24, as will be later described in detail. Briefly speaking, this data allocation section 23 performs a predetermined data allocation process such that the latest received acceleration data set passed from the error determination section 22 is stored in the first received data memory D1, the second-latest received acceleration data set is stored in the second received data memory D2 and the third-latest received acceleration data set is stored in the third received data memory D3.

As further shown in FIG. 4, the collision judgment control unit 30 includes the detected data output section 31 that retrieves and outputs, as a detected acceleration data set, one of the data sets stored in the received data memories D1, D2 and D3 of the received data control unit 20. The collision judgment control unit 30 also includes a detected data memory 34 for storing the detected acceleration data set in case of a possible deficiency of the received data, and a compensating-value calculation section 32a that, upon termination of a data deficiency, calculate an appropriate compensating value. The collision judgment control unit 30 also includes a collision-judging-value calculation section 32 that calculates a collision judging value on the basis of a plurality of acceleration values, and a comparison section 33 that compares the calculated collision judging value and a predetermined collision-judging threshold value 35. Here, the "data deficiency" means a state where all of the data sets stored in the three received data memories D1, D2 and D3 are erroneous data sets.

More specifically, the detected data output section 31 extracts the latest proper data set, from among the data sets stored in the three received data memories D1, D2 and D3, with reference to the data discrimination bit, and it outputs, to the collision-judging-value calculation section 32, the thus-extracted latest proper data set as the detected acceleration data set. The collision-judging-value calculation section 32 sums up the acceleration values represented by ten previous detected acceleration data sets, to thereby calculate a collision judging value. The thus-calculated collision judging value is given to the comparison section 33, which compares the calculated collision judging value and a preset collision-judging threshold value 35. If the calculated collision judging value is equivalent to or greater than the collision-judging threshold value 35, the collision judgment control unit 30 determines that some collision has occurred between the vehicle and a certain external object, and then it outputs a driving signal to activate the hood actuator 15 so that the vehicle hood 16 can be flipped up automatically to lessen the collision impact. Details of the collision judgment will be described later. The following paragraphs explain detailed relationships between the acceleration value and the acceleration data set, an error determination process performed by the error determination section 22, and a process performed by the data allocation section 23.

Table 1 below diagrammatically shows relationships between the acceleration values (each represented by a "G" value) detected by the acceleration sensor 11 and the acceleration data sets from the censor unit 10 to be transmitted to the ECU 14.

TABLE 1

| DETECTED ACCELERATION | | DATA | | | | | |
|---|---|---|---|---|---|---|---|
| | | ACCELERATION DATA | | | | | PARITY |
| (G) | BINARY | 5TH BIT | 4TH BIT | 3RD BIT | 2ND BIT | 1ST BIT | BIT |
| 0 | 00000 | 0 | 0 | 0 | 0 | 0 | 0 |
| 1 | 00001 | 0 | 0 | 0 | 0 | 1 | 1 |
| 2 | 00010 | 0 | 0 | 0 | 1 | 0 | 1 |
| 3 | 00011 | 0 | 0 | 0 | 1 | 1 | 0 |
| 4 | 00100 | 0 | 0 | 1 | 0 | 0 | 1 |
| 5 | 00101 | 0 | 0 | 1 | 0 | 1 | 0 |
| 6 | 00110 | 0 | 0 | 1 | 1 | 0 | 0 |
| 7 | 00111 | 0 | 0 | 1 | 1 | 1 | 1 |
| 8 | 01000 | 0 | 1 | 0 | 0 | 0 | 1 |
| 9 | 01001 | 0 | 1 | 0 | 0 | 1 | 0 |
| 10 | 01010 | 0 | 1 | 0 | 1 | 0 | 0 |
| . | . | . | | | | | |
| . | . | . | | | | | |
| . | . | . | | | | | |
| 31 | 11111 | 1 | 1 | 1 | 1 | 1 | 1 |

As briefed above, each acceleration data set to be transmitted is made up of a total of six bits, five bits of acceleration data and one bit of a parity check code. The five-bit acceleration data represents the sensor-detected acceleration value in a five-digit binary number. The parity bit is set at a value "0" when an even number of "1" bits are included in the binary number of the acceleration data, but set at a value "1" when an odd number of "1" bits are included in the binary number. If the detected acceleration value is 7G, then the value "7" is converted into a binary number "00111" that are then allocated to the five bits of the acceleration data. Because three "1" bits, i.e. an odd number of "1" bits, are included in the five-bit acceleration data, the parity bit is set at the value "1". Thus, when the acceleration value is 7G like this, "001111" are transmitted, as the five-bit acceleration data set, to the ECU 14. Likewise, other acceleration values are each converted into an acceleration data set representing a sensor-detected acceleration value in a binary number and a parity bit, and then transmitted to the ECU 14.

Table 2 below diagrammatically shows examples A–D of the determination, by the error determination section 22, as to propriety of the acceleration data sets.

TABLE 2

| | ACCELERATION DATA | | | | | PARITY | RESULT OF DATA |
|---|---|---|---|---|---|---|---|
| | 5TH BIT | 4TH BIT | 3RD BIT | 2ND BIT | 1ST BIT | BIT | DETERMINATION |
| A | 0 | 0 | 1 | 0 | 1 | 0 | PROPER DATA (ACCEL. = 5G) |
| B | 0 | 1 | 1 | 0 | 1 | 0 | ERRONEOUS DATA |
| C | 0 | 0 | 1 | 1 | 1 | 1 | PROPER DATA (ACCEL. = 7G) |
| D | 0 | 1 | 1 | 1 | 1 | 1 | ERRONEOUS DATA |

Specifically, for example A, the five-bit acceleration data is "00101" and the parity bit is "0". In this case, it is determined that the acceleration data set has been received properly with no error because an even number of "1" bits (i.e., two "1" bits) are included in the acceleration data just as indicated by the parity bit "0", and the sensor-detected acceleration value is determined as "5G". For example B, the acceleration data is "01101" and the parity bit is "0". Here, it is determined that the acceleration data set is an erroneous data set because an odd number of "1" bits (i.e., three "1" bits) are included in the acceleration data although the parity bit is "0". In this case, it is very likely that electrical noises have been introduced in the communication cable 17 during transmission, of the acceleration data set, from the sensor unit 10 to the ECU 14 and the introduced electrical noises have garbled the data.

For example C, the acceleration data is "00111" and the parity bit is "1". Here, it is determined that the acceleration data set has been received properly with no error because an odd number of "1" bits (three "1" bits) are included in the acceleration data just as indicated by the parity bit "1", and the acceleration value is determined as "7G". For example D, the acceleration data is "01111" and the parity bit is "1". Here, it is determined that the acceleration data set is an erroneous data set because an even number of "1" bits (four "1" bits) are included in the acceleration data although the parity bit is "1". In this case too, it is very likely that electrical noises have been introduced in the communication cable 17 during transmission, of the acceleration data set, from the sensor unit 10 to the ECU 14 and the introduced electrical noises have garbled the data, as in example B.

Figure 5:
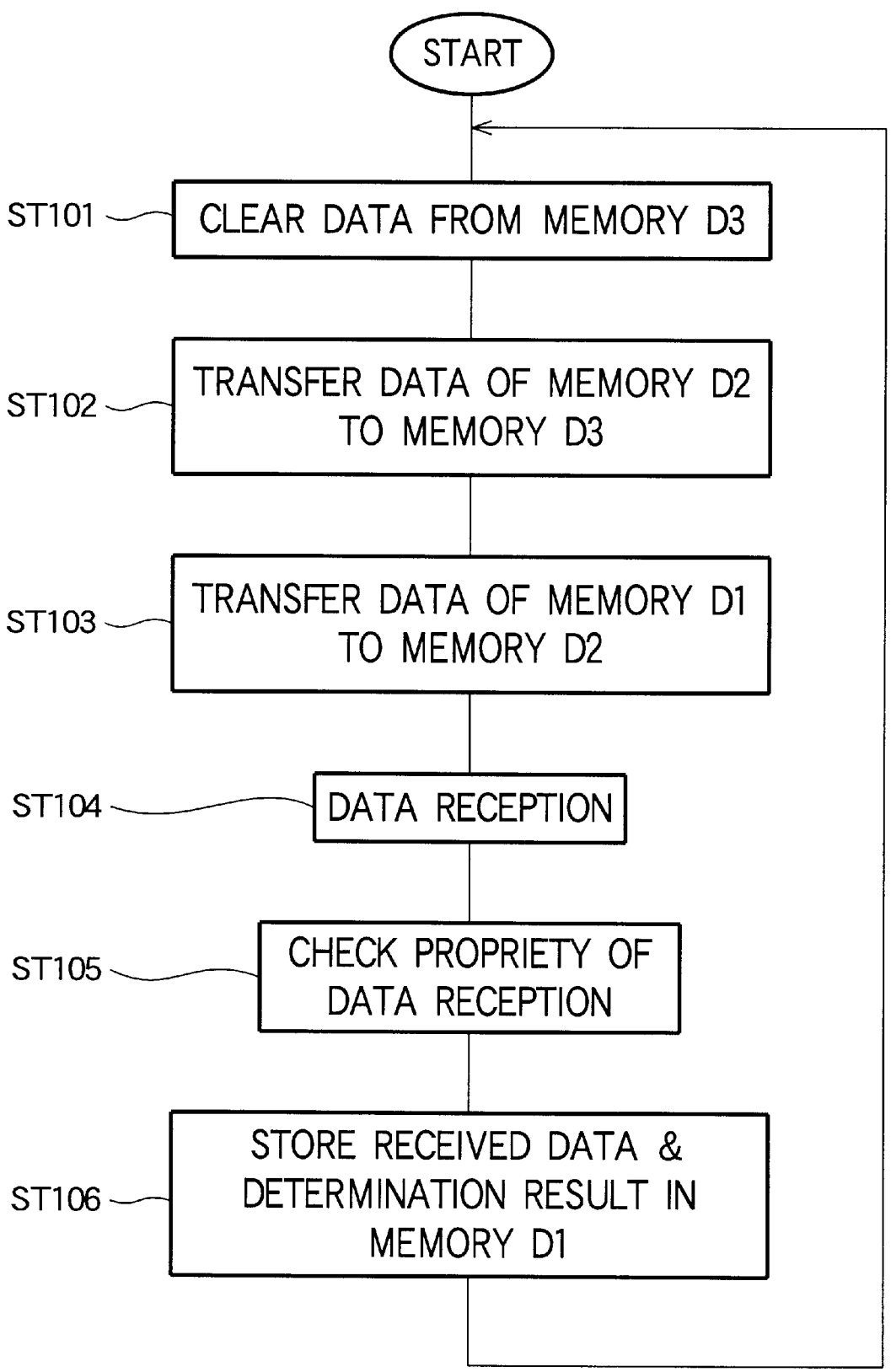
FIG. 5 is a flow chart showing an exemplary step sequence of a data allocation process performed by a data allocation section of a received data control unit in the embodiment.

Reference is made next to FIG. 5 showing an exemplary step sequence of the data allocation process performed by the data allocation section 23 of the received data control unit 20. First, at step ST101, the stored received acceleration data set is cleared from the received data memory D3. Then, the received acceleration data set stored in the received data memory D2 is transferred to the received data memory D3 at step ST102, and the received acceleration data set stored in the received data memory D1 is transferred to the received data memory D2 at step ST103. At step ST104, the reception section 21 receives a new acceleration data set from the sensor unit 10. The error determination section 22 then determines, at step ST105, whether the acceleration data set has been received properly from the sensor unit 10. At next step ST106, the result of the determination by the error determination section 22 and the newly-received acceleration data set are stored in the received data memory D1. The above-mentioned operations of steps ST101 to ST106 are carried out in a repeated fashion.

Thus, the above-mentioned operations of steps ST101 to ST106 allows the received data memory D1 to always store the latest received acceleration data set and the corresponding error determination result, the received data memory D2 to always store the second-latest received acceleration data set and the corresponding error determination result and the received data memory D3 to always store the third-latest received acceleration data set and the corresponding error determination result.

Because the received data control unit 20 operates in synchronism with each output pulse of the clock 25 as noted above, the received acceleration data sets stored in the received data memories D1, D2 and D3 of the storage section 24 are relocated in synchronism with each output pulse of the clock 25. Because the collision judgment control unit 30, on the other hand, operates in synchronism with each output pulse of the frequency divider 26, the detected data output section 31 outputs the detected acceleration data set to the collision-judging-value calculation section 32 in synchronism with each output pulse of the frequency divider 26.

Figure 6:
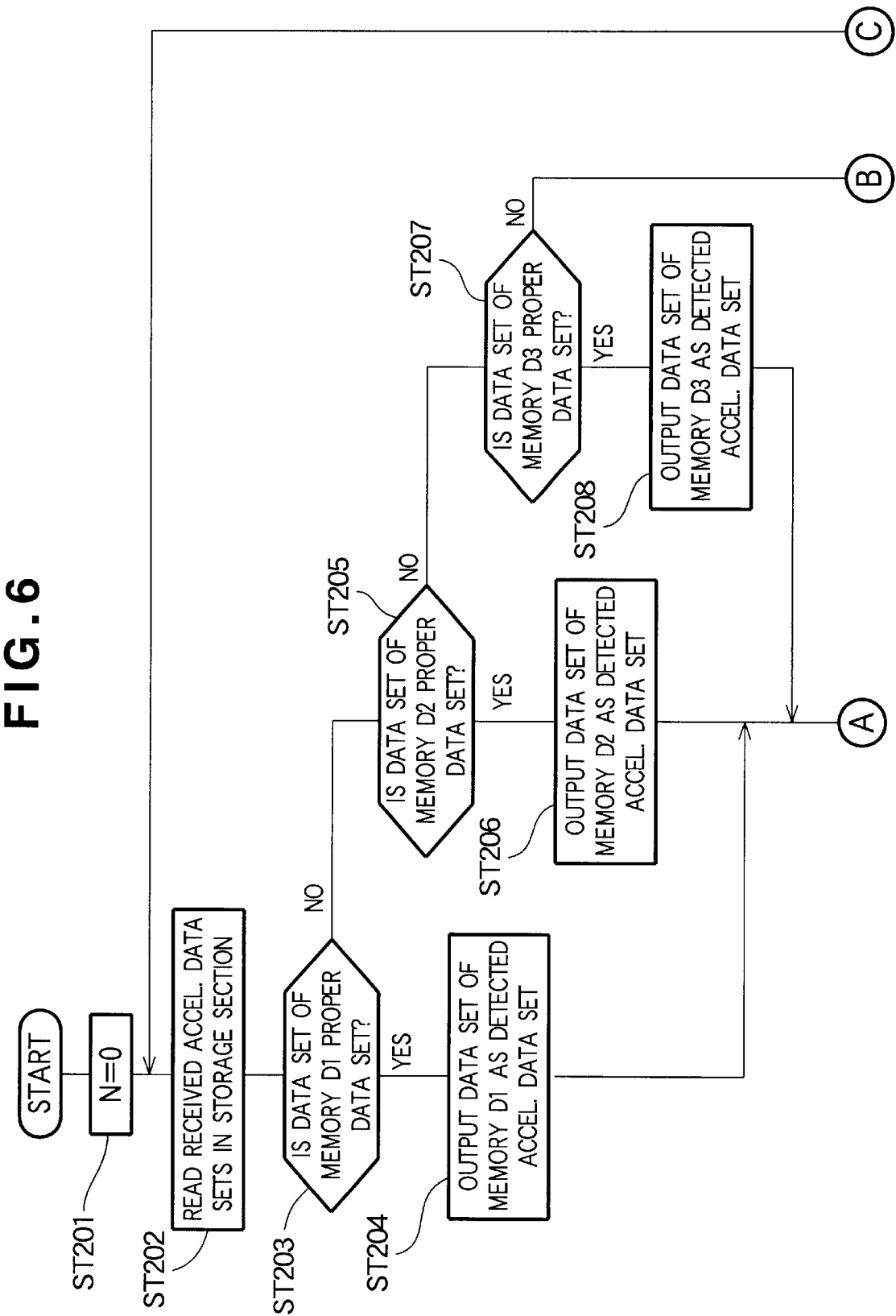
FIG. 6 is a flow chart showing an exemplary step sequence of a collision judgment process performed by a collision judgment control unit in the embodiment.
Figure 6:
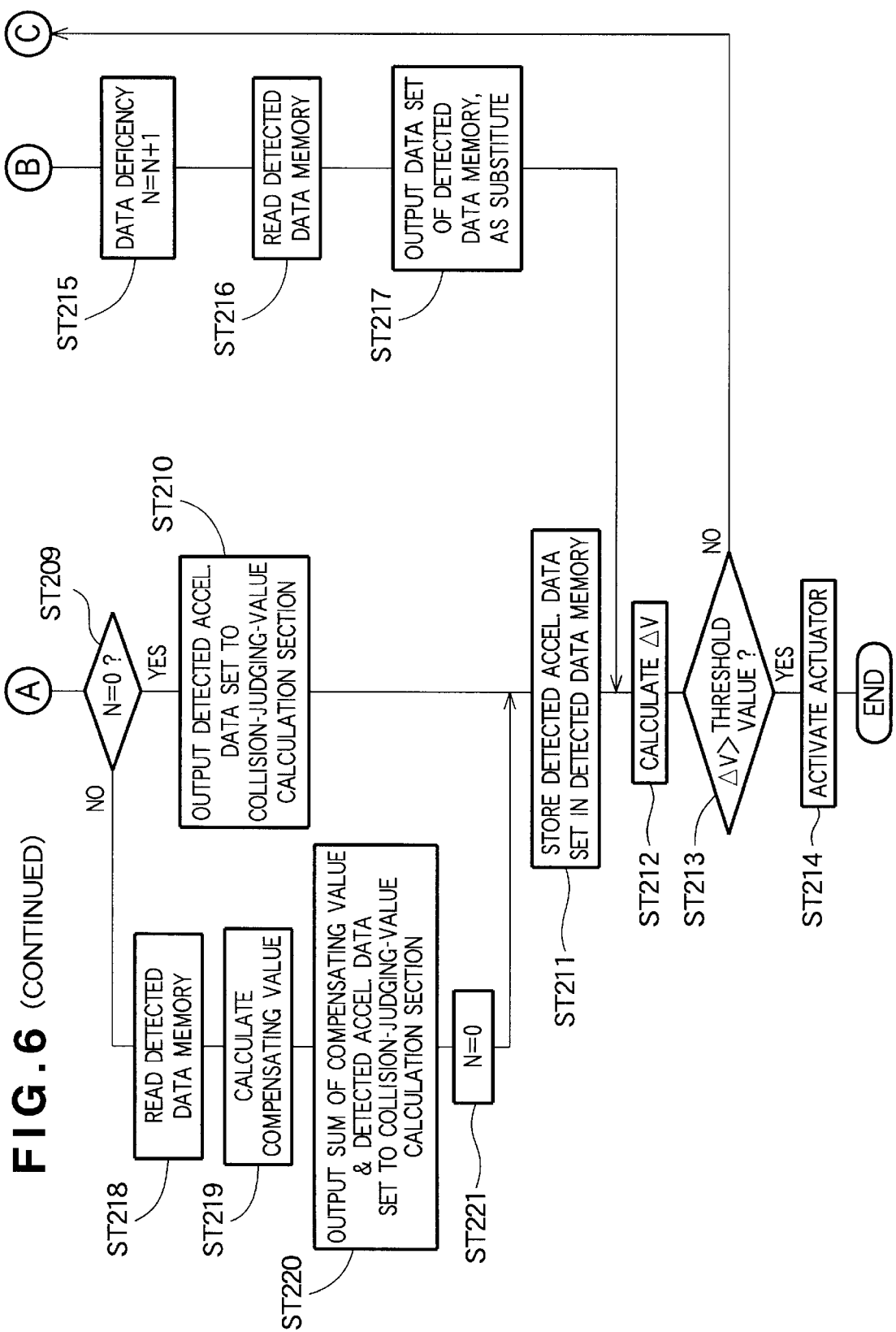

FIG. 6 is a flow chart showing an exemplary step sequence of the collision judgment process performed by the collision judgment control unit 30. First, at step ST201, the collision-judging-value calculation section 32 resets stored contents of a number-of-data-deficiency register N. At next step ST202, the acceleration data sets currently stored in the received data memories D1, D2 and D3 of the received data control unit 20 are read out by the detected data output section 31. If the acceleration data set currently stored in the first received data memory D1 is an error-free proper data set as determined at step ST203, the collision judgment control unit 30 moves on to step ST204, but if the acceleration data set currently stored in the first received data memory D1 is an erroneous data set, the collision judgment control unit 30 branches to step ST205. At step ST204, the collision judgment control unit 30 outputs, as a detected acceleration data set, the acceleration data set currently stored in the received data memory D1. After that, the control unit 30 proceeds to step ST209.

Then, a determination is made, at step ST205, as to whether the acceleration data set currently stored in the second received data memory D2 is an error-free proper data set. If the acceleration data set currently stored in the second received data memory D2 is an error-free proper data set as determined at step ST205, the collision judgment control unit 30 moves on to step ST206, but if not, the collision judgment control unit 30 branches to step ST207. At step ST206, the collision judgment control unit 30 outputs, as a detected acceleration data set, the acceleration data set currently stored in the second received data memory D2. After that, the control unit 30 proceeds to step ST209.

Then, a determination is made, at step ST207, as to whether the acceleration data set currently stored in the third received data memory D3 is an error-free proper data set. If the acceleration data set currently stored in the third received data memory D3 is an error-free proper data set as determined at step ST207, the collision judgment control unit 30 moves on to step ST208, but if not, the collision judgment control unit 30 branches to step ST215. At step ST208, the collision judgment control unit 30 outputs, as a detected acceleration data set, the acceleration data set currently stored in the third received data memory D3. After that, the control unit 30 proceeds to step ST209.

The above-mentioned operations at steps ST202 to ST208 are designed in such a manner that, if any one of the acceleration data sets stored in the received data memories D1, D2 and D3 is an error-free proper data set, the collision judgment control unit 30 goes to step ST209, but if all of the stored acceleration data sets are erroneous data sets, the collision judgment control unit 30 goes to step ST215. Specifically, these steps are carried out by the detected data output section 31.

At step ST209, the collision-judging-value calculation section 32 ascertains whether or not the number of data deficiencies N is "0". If the number N is "0" (N=0), the detected acceleration data set input to the collision-judging-value calculation section 32 is used directly, as it is, for judgment of a possibility of a vehicle collision (step ST210).

Then, at step ST211, the detected acceleration data set is stored in the detected data memory 34. At next step ST212, the collision-judging-value calculation section 32 calculates a collision judging value $\Delta V$ using the detected acceleration data set and predetermined substitute data set. The substitute data set is one stored in the detected data memory 34 so as to be used in the event that data deficiencies occur, as will be later described. The collision judging value $\Delta V$ is calculated by determining a sum of acceleration values detected for a time period from a predetermined previous time point to the current time point, and it represents intensity of an impact that is to be used as a basis for the collision judgment. The collision-judging-value calculation section 32 sums up, for example, ten previous detected acceleration values, to thereby calculate the collision judging value collision judging value $\Delta V$. The thus-calculated collision judging value $\Delta V$ is given to the comparison section 33.

The comparison section 33 compares the calculated collision judging value $\Delta V$ to the preset collision-judging threshold value 35, at step ST213. If the collision judging value $\Delta V$ is not greater than the preset collision-judging threshold value 35, then the comparison section 33 outputs a driving signal to activate the hood actuator 15, at step S214.

When the communication has been performed properly between the sensor unit 10 and the ECU 14 with no unwanted data deficiency involved, the collision judgment is made through the above-described operations of steps ST209 to ST213, so that the hood actuator 15 is activated at step ST214. In a case where all the received acceleration data sets stored in the storage section 24 are erroneous data sets having some deficiencies, and in a case where the communication between the sensor unit 10 and the ECU 14 is performed properly after occurrence of some data deficiencies, the collision judgment is carried out in a manner to be set forth below.

If all of the acceleration data sets stored in the received data memories D1, D2 and D3 have been determined, by the detected data output section 31, as being erroneous data sets having some data deficiencies, the collision-judging-value calculation section 32 increments the number of data deficiencies N by one (N+1) at step ST215. Because, at this point, there is no detected acceleration data set to be input to the collision-judging-value calculation section 32, the detected acceleration data set stored previously in the detected data memory 34 prior to the occurrence of the data deficiencies is read out at next step ST216. The thus read-out detected acceleration data set is passed, as a substitute data set, to the collision-judging-value calculation section 32, at step ST217. In this case, the collision-judging-value calculation section 32 calculates a collision judging value ΔV taking the substitute data set into account, and supplies the thus-calculated collision judging value ΔV to the comparison section 33 at step ST212. The following paragraphs describe the collision judgment carried out when the communication between the sensor unit 10 and the ECU 14 has been performed properly after the data deficiency as mentioned above occurred a few times.

If the number of data deficiencies N is not "0" as determined at step ST209, namely, if there has occurred a data deficiency in an immediately-preceding operating cycle, the collision-judging-value calculation section 32 reads out the detected acceleration data set currently stored in the detected data memory 34 at step ST218. Then, at step ST219, the compensating-value calculation section 32a of the collision-judging-value calculation section 32 calculates a compensating value at step ST219. If the current detected acceleration data set stored immediately after the termination of the data deficiency occurrence is represented as "$G_A$", the detected acceleration data set previously stored in the detected data memory 34 prior to the data deficiency occurrence is represented as "$G_B$" and the number of data deficiencies having occurred is represented by N, the compensating value can be calculated by the mathematical expression:

Compensating Value=$(G_A-G_B) \times N/2$

Then, a value obtained by adding the compensating value to the current detected acceleration data set is given to the collision-judging-value calculation section 32, at step ST220. Then, at step ST221, the number of data deficiencies N is reset to "0".

At step ST211, only the current detected acceleration data set ($G_A$) is stored in the detected data memory 34. At next step ST212, the collision-judging-value calculation section 32 calculates a collision judging value ΔV having the corrected detected acceleration data set taken into account, and it outputs the thus-calculated collision judging value ΔV to the comparison section 33. Namely, the collision-judging-value calculation section 32 calculates such a collision judging value ΔV using the value obtained by adding the compensating value to the current detected acceleration data set GA.

Table 3 below shows relationships between the stored contents of the received data memories D1, D2 and D3 and the detected acceleration data sets read out by the detected data output section 31.

TABLE 3

| MEMORY D1 | MEMORY D2 | MEMORY D3 | DETECTED ACCELERATION DATA SET |
|---|---|---|---|
| PROPER DATA SET | PROPER DATA SET | PROPER DATA SET | DATA SET OF MEMORY D1 |
| PROPER DATA SET | ERRONEOUS DATA SET | PROPER DATA SET | DATA SET OF MEMORY D1 |
| PROPER DATA SET | PROPER DATA SET | ERRONEOUS DATA SET | DATA SET OF MEMORY D1 |
| PROPER DATA SET | ERRONEOUS DATA SET | ERRONEOUS DATA SET | DATA SET OF MEMORY D1 |
| ERRONEOUS DATA SET | PROPER DATA SET | PROPER DATA SET | DATA SET OF MEMORY D2 |
| ERRONEOUS DATA SET | PROPER DATA SET | ERRONEOUS DATA SET | DATA SET OF MEMORY D2 |
| ERRONEOUS DATA SET | ERRONEOUS DATA SET | PROPER DATA SET | DATA SET OF MEMORY D3 |
| ERRONEOUS DATA SET | ERRONEOUS DATA SET | ERRONEOUS DATA SET | NONE |

In determining a single detected acceleration data set to be used, the output section 31 refers to all of the received acceleration data sets stored in the storage section 24 of the received data control unit 20. If the latest received acceleration data set currently stored in the first received data memory D1 is an error-free proper data set, the received acceleration data set of the memory D1 is output as the detected acceleration data set. If the received acceleration data set currently stored in the received data memory D1 is an erroneous data set and the received acceleration data set currently stored in the second received data memory D2 is an error-free proper data set, then the received acceleration data set of the memory D2 is output as the detected acceleration data set. Further, if both of the received acceleration data sets currently stored in the first and second received data memories D1 and D2 are erroneous data sets and only the received acceleration data set currently stored in the third received data memory D3 is an error-free proper data set, then the received acceleration data set of the memory D3 is output as the detected acceleration data set. Further, in the event that all of the received acceleration data sets currently stored in the memories D1, D2 and D3 are erroneous data sets, it is determined that some data deficiencies have occurred, so that no detected acceleration data set is output.

Namely, even in the case where an acceleration data set has not been properly received from the sensor unit 10 due to electrical noises, the acceleration detected by the acceleration sensor 11 can be acquired unless all of the received acceleration data sets stored in the memories D1, D2 and D3 are erroneous. With this arrangement, the instant embodiment can perform the collision judgment successively with no unwanted interruption, with the result that resistance to the electrical noises can be enhanced significantly.

Figure 7:
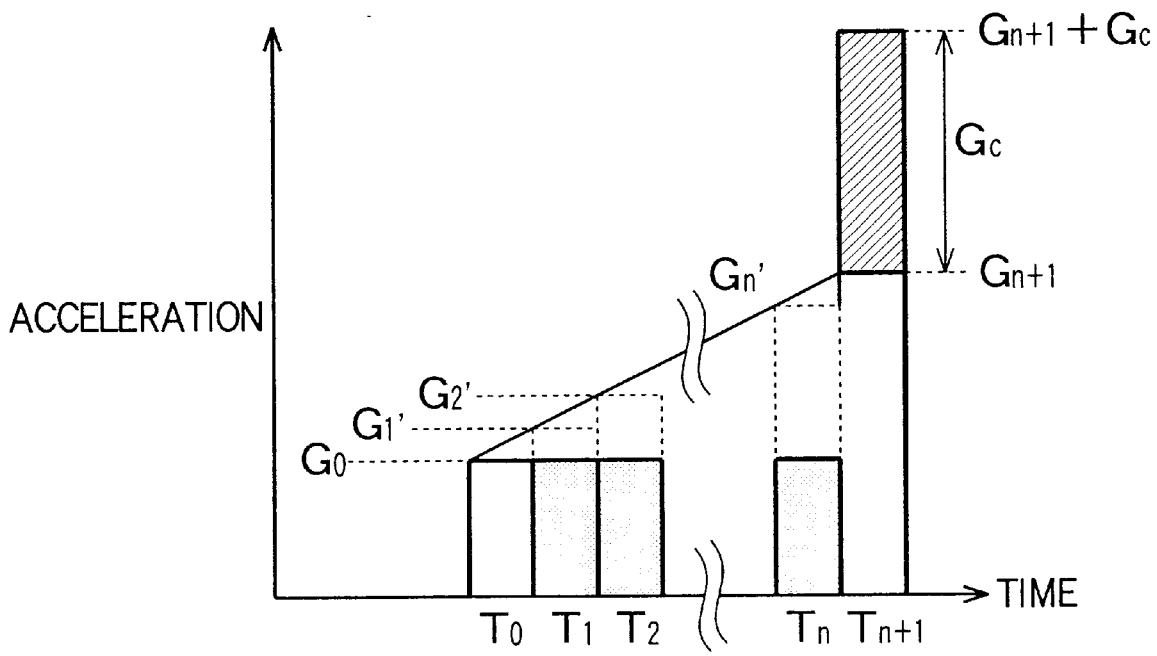
FIG. 7 is a diagram showing a variation over time of the acceleration value.

This and following paragraphs describe how the compensating value is calculated immediately following the occurrence of data deficiencies. FIG. 7 shows a variation over time of the detected acceleration data set, related to an acceleration value used in the collision judgment by the collision-judging-value calculation section 32, in a case where, after input of a detected acceleration data set $G_0$ at a time point $T_0$, n (n is an arbitrary number more than one) data deficiencies occur in succession at and after a time point $T_1$ and then another detected acceleration data set $G_{n+1}$ is input at a time point $T_{n+1}$. Specifically, at the time point $T_0$, the detected acceleration data set $G_0$ is input and used in the collision judgment. During the data deficiency occurrence at and after the time point $T_1$, the last-input detected acceleration data set $G_0$ is used, as a substitute data set, in the collision judgment. As noted above, the detected acceleration data set $G_0$ is a data set contained in the detected data memory 34.

In FIG. 7, acceleration values corresponding to time regions denoted by dotted lines represent the substitute data. At the time point $T_{n+1}$, the detected acceleration data set $G_{n+1}$ is input. Because this detected acceleration data set $G_{n+1}$ is used in the first collision judgment after the termination of the occurrence of the data deficiencies, the compensating-value calculation section 32a calculates a compensating value $G_c$. Then, the collision-judging-value calculation section 32 makes the collision judgment using a value obtained by adding the compensating value $G_c$ to the detected acceleration data set $G_{n+1}$. Because, in this case, the detected acceleration data set input immediately before the occurrence of the data deficiencies is "$G_0$", the detected acceleration data set input immediately after the termination of the occurrence of the data deficiencies is "$G_{n+1}$" and the number of the data deficiencies is "n", the compensating value $G_c$ can be given by a mathematical expression "$(G_{n+1}-G_0)\times n/2$". In the figure, the acceleration value of a hatched region represents the compensating value $G_c$, which is shown as added to the detected acceleration data set $G_{n+1}$.

Specifically, the mathematical expression for calculating the compensating value can be derived as follows. Assuming that the acceleration increases or decreases at a constant increase or decrease rate from the time point $T_0$ to the time point $T_{n+1}$, acceleration values at the individual time points during the occurrence of the data deficiencies are presumed as "$G_1'$", "$G_2'$", . . . , "$G_n'$". The presumed acceleration values at the individual time points can be expressed as follows:

at the time point $T_1$, $G_1' = G_0 + (G_{n+1} - G_0)/(n+1)$;

at the next time point $T_2$, $G_2' = G_0 + (G_{n+1} - G_0) \times 2/(n+1)$;

- - - ; and, at the time point $T_n$, $G_n' = G_0 + (G_{n+1} - G_0) \times n/(n+1)$.

Thus, a sum of differences, of the presumed values, from the value represented by the detected acceleration data set $G_0$, used as the substitute data at the individual time points during the occurrence of the data deficiencies, can be calculated by $(G_{n+1} - G_0) \times (1+2+ \ldots +n)/(n+1)$ This mathematical expression can also be expressed as $(G_{n+1} - G_0) \times n/2$ The sum is set as the compensating value $G_c$ that is calculated at the time point $T_{n+1}$.

Namely, the instant embodiment can make the collision judgment successively with no unwanted interruption, despite the occurrence of the data deficiencies. Because, during the data deficiency occurrence, the instant embodiment uses, as the substitute data, the value previously stored in the detected data memory 34 prior to the occurrence of the data deficiencies. Further, upon the termination of the data deficiency occurrence, the instant embodiment calculates, as the compensating value, the sum of the differences between the data estimated on the basis of the values input immediately before and after the data deficiency occurrence and adds the thus-calculated compensating value to the detected acceleration data set input immediately after the termination of the data deficiency occurrence. In this way, it is possible to prevent the collision judging performance from being lowered due to the data deficiency occurrence. In other words, even when some data deficiencies have occurred, the instant embodiment can provide a collision judging value close to a proper value that would have been provided when the data deficiencies did not occur.

Figure 8:
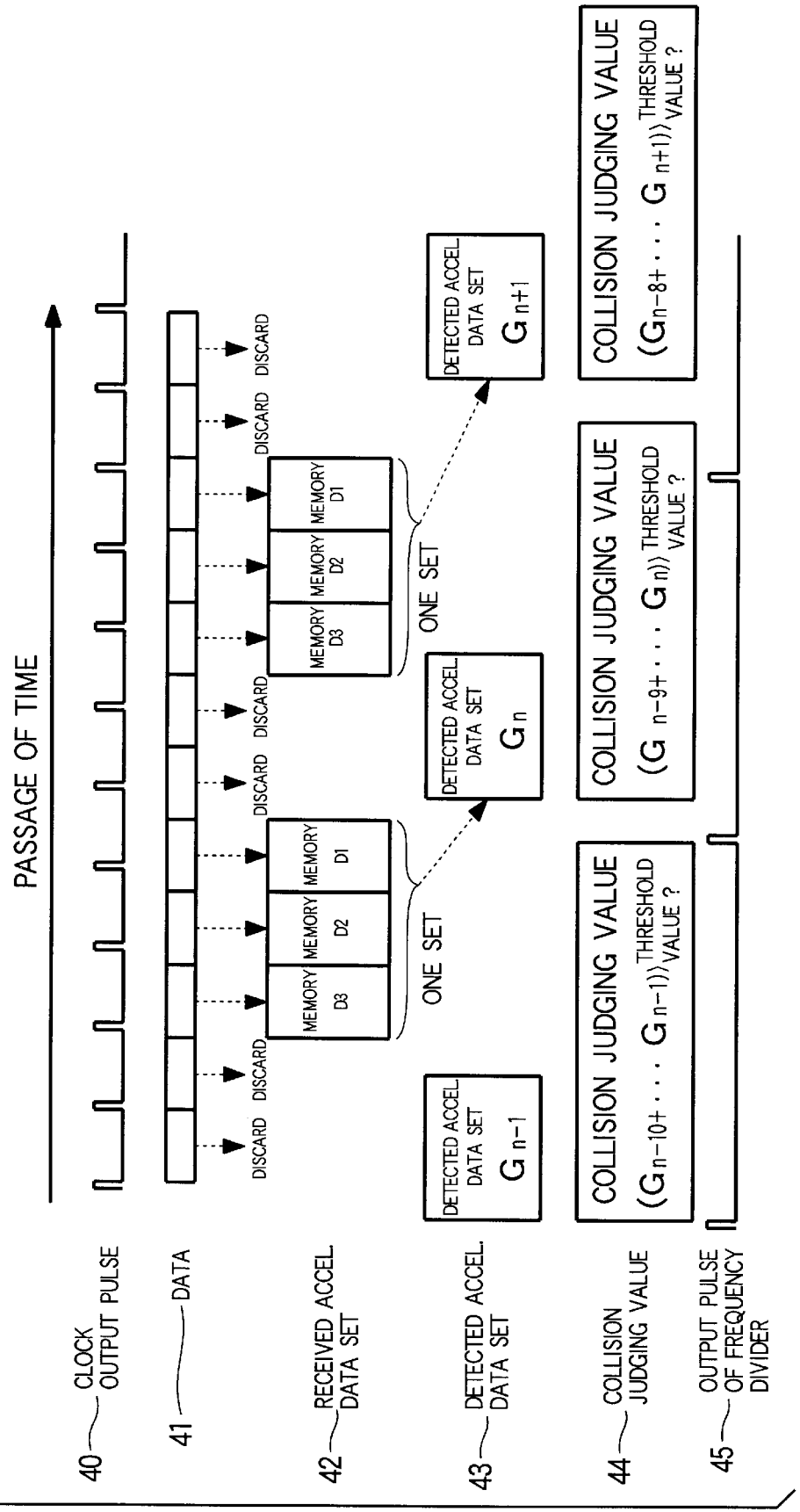
FIG. 8 is a diagram showing examples of variations over time of various data in the embodiment.

Next, a description will be made about variations over time of the received acceleration data set, detected acceleration data set and collision judging value in relation to the operating cycles of the clock 25 and frequency divider 26. FIG. 8 is a diagram showing examples of the variations over time of the various data in the instant embodiment. From FIG. 8, it can be seen that the frequency divider 26 produces one pulse 45 every five (fifth) output pulses 40 of the clock 25. Because the reception section 21 operates in synchronism with the operating cycle of the clock 25, it receives one data set 41 each time the clock pulse 40 is output from the clock 25. However, in the instant embodiment, where three successive data sets 41 received by the reception section 21 in response to three clock pulses 40 are stored in the three received data memories D1, D2 and D3 of the storage section 24, the remaining two data sets 41 received via the reception section 21 in response to the remaining clock pulses 40 are discarded.

In synchronism with the operating cycle of the frequency divider 26, the detected data output section 31 selects, as the detected acceleration data set 43, one error-free proper data set from among the data sets stored in the received data memories D1, D2 and D3. The collision judging value 44 is calculated in response to each output pulse 45 of the frequency divider 45, as a sum of the acceleration values represented by ten previous detected acceleration data sets having been selected from among the received acceleration data sets stored in the received data memories D1, D2 and D3 in the above-mentioned manner.

Figure 9:
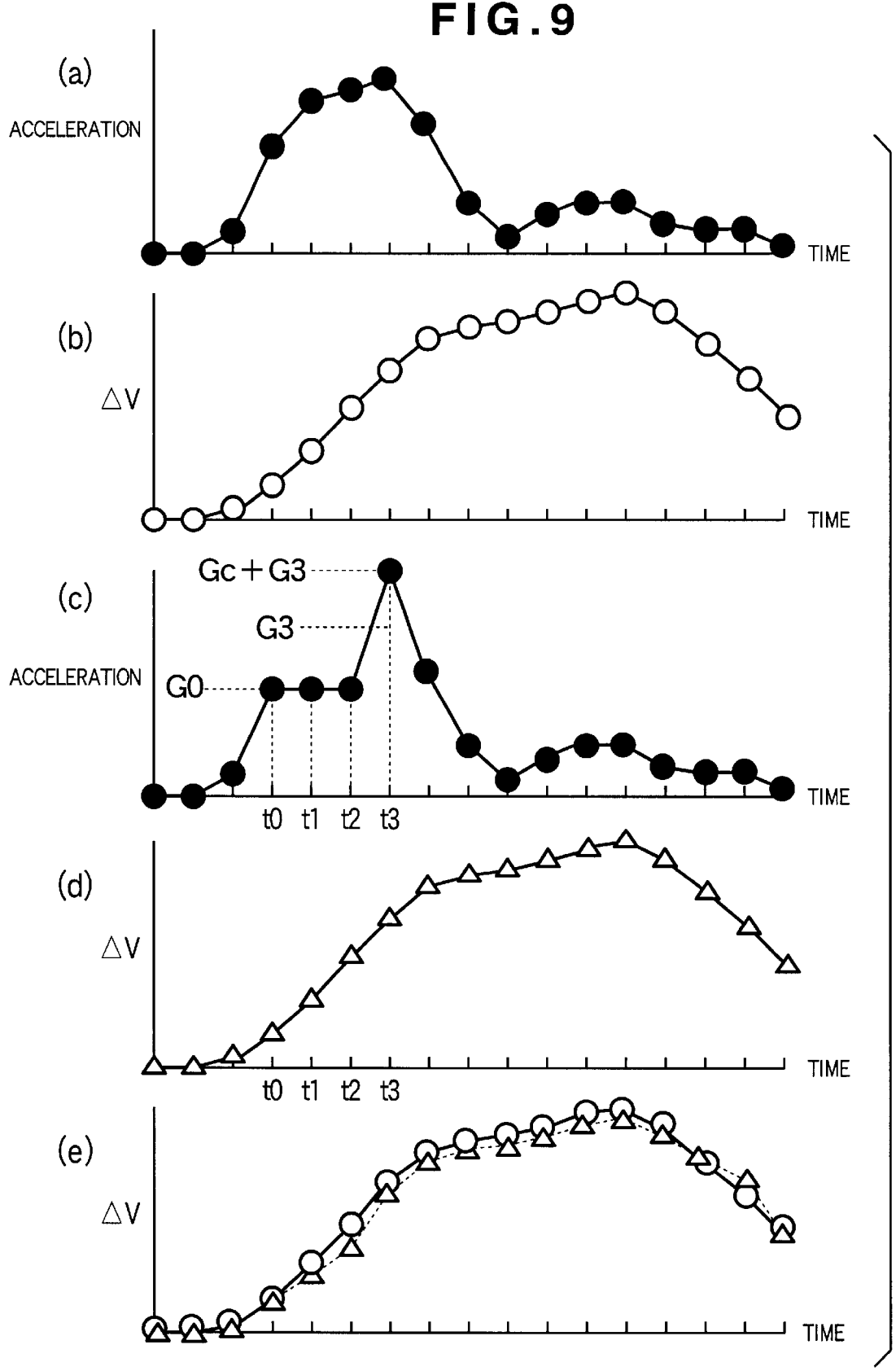
FIG. 9 is a diagram showing various examples of acceleration waveforms and collision judging values detected in a vehicle collision, which particularly shows the acceleration waveforms and collision judging values in relation to a case where data deficiencies were encountered and a case where no data deficiency was encountered.
Figure 10:
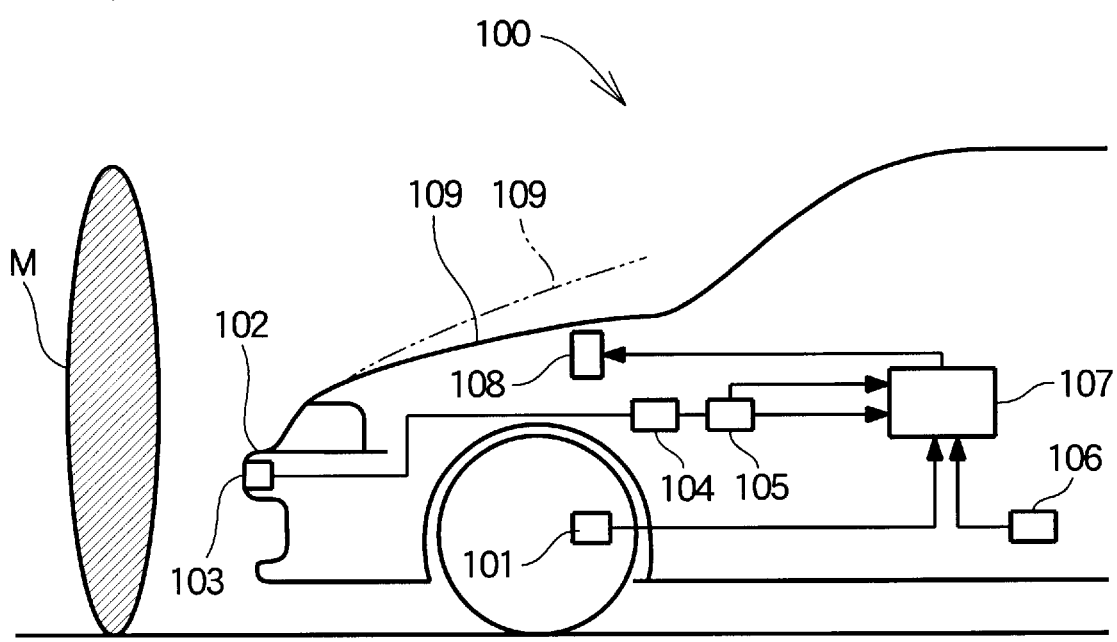
FIG. 10 is a view schematically showing an example of a conventionally-known collision judgment system.

FIG. 9 is a diagram showing various examples of acceleration waveforms detected during a vehicle collision, which particularly verifies that the present invention can exhibit substantially the same superior collision judging performance for both a case where the communication from the sensor unit 10 to the ECU 14 is performed properly with no data deficiency and a case where some data deficiencies occur due to erroneous data communication. Specifically, section (a) of FIG. 9 is a graph showing a variation over time of the acceleration value when there is no data deficiency, and section (b) of FIG. 9 is a graph showing a variation over time of the collision judging value $\Delta V$ calculated on the basis of the acceleration shown in section (a). The collision judging value $\Delta V$ is calculated as a sum of ten previous acceleration values.

In contrast to sections (a) and (b), section (c) of FIG. 9 shows a variation over time of the acceleration value used in the collision judgment when data deficiencies have occurred at time points t1 and t2. Because a detected acceleration data set $G_0$ input at the time point t0 immediately before the occurrence of the data deficiencies is set as the substitute data at the time points t1 and t2, the acceleration value represented by the detected acceleration data set $G_0$ is used in the collision judgments at the time points t1 and t2. Because another detected acceleration data set $G_3$ is input, at a subsequent time point t3, for the first collision judgment after the occurrence of the data deficiencies, an acceleration value determined by adding together the acceleration value represented by the detected acceleration data set $G_3$ and a compensating value $G_c$ calculated by the compensating-value calculation section 32a is used in the collision judgment. Note that, because two data deficiencies occur in the illustrated example, the compensating value $G_c$ is calculated by a subtraction "$G_3-G_0$" ($G_c=G_3-G_0$).

Further, section (d) of FIG. 9 shows a variation over time of the collision judging value ΔV calculated on the basis of the acceleration of section (c) using a calculation process similar to that of section (b). Furthermore, section (e) of FIG. 9 shows the waveforms of the collision judging value ΔV of section (b) (denoted by circular marks "◯" and solid lines in section (e)) and the collision judging value ΔV of section (d) (denoted by triangular marks "△" and dotted lines in section (e)), in overlapped relation to each other. From section (e) of FIG. 9, it can be seen that there is no substantial difference between the collision judging value ΔV calculated in the case where no data deficiency has occurred and the collision judging value ΔV calculated in the case where the data deficiencies have occurred. Therefore, the collision judging system of the present invention can reliably prevent the collision judging performance from being lowered due to the data deficiencies.

Whereas the collision judging system of the present invention has been described above as including the sensor unit 10 in the vehicle's front end portion 3, the sensor unit 10 may also be provided in left and right sides and the like of the vehicle for the collision judging purposes. Because the collision judgment control unit 30 operates in an operating cycle longer than the received data control unit 20, the collision judgment control unit 30 may be arranged to perform, on a time-divisional basis, the processing on the sensor unit 10 provided in the vehicle's front end portion 3 and the processing on the sensor units provided in the vehicle's left and right sides. Further, the data allocation section 23 may be arranged to impart time data to each received acceleration data set so that received acceleration data sets are stored in the storage section 24 along with the time data and the detected data output section 31 outputs the latest error-free proper data set with reference to the imparted time data.

With the above-described arrangements, the present invention achieves various benefits. Particularly, the present invention is characterized in that: the data conversion section converts each acceleration, detected by the acceleration sensor, into an acceleration data set including a check code; the error determination section determines whether or not the acceleration data sets have been received properly with no error and output each properly-received acceleration data set as a proper data set and each improperly-received acceleration data set as an erroneous data set; and a possibility of a collision is judged only on the basis of the latest proper data set of the received acceleration data sets stored in the first storage section. With such arrangements, the present invention can prevent the deterioration of the collision judging performance.

The present invention is also characterized by provision of the detected data memory for storing a proper detected acceleration data set in case all the received acceleration data sets stored in the first storage section are erroneous data sets. Thus, the present invention can make the collision judgment successively with no intermission.

The present disclosure relates to the subject matter of Japanese Patent Application No. 2001-265398, filed Sep. 3, 2001, the disclosure of which is expressly incorporated herein by reference in its entirety.

What is claimed is:

1. A collision judging system comprising:

a sensor unit including: an acceleration sensor for detecting acceleration; a data conversion section for converting the acceleration, detected by said acceleration sensor, into an acceleration data set including a check code; and a transmission section for transmitting the acceleration data set converted by said data conversion section;

a received data control unit including: a reception section for receiving the acceleration data set transmitted from said transmission section of said sensor unit; an error determination section for determining, with reference to the check code included in the acceleration data set, whether the acceleration data set has been received properly from said transmission section via said reception section, and outputting the received acceleration data set as a proper data set when it is determined that the acceleration data set has been received properly but as an erroneous data set when it is determined that the acceleration data set has not been received properly; and a first storage section for storing a plurality of the acceleration data sets output by said error determination section; and a collision judgment control unit for making a collision judgment on the basis of a latest proper data set of the plurality of the acceleration data sets stored in said first storage section.

2. A collision judging system as claimed in claim 1 wherein said collision judgment control unit includes a second storage section for storing the latest proper data set of the plurality of the acceleration data sets stored in said first storage section and wherein when said collision judgment control unit has made an error determination that all of the plurality of the acceleration data sets stored in said first storage section are erroneous data sets, said collision judgment control unit makes the collision judgment on the basis of the proper data set stored in said second storage section.

3. A collision judging system as claimed in claim 2 wherein said collision judgment control unit further includes a compensating-value calculation section for calculating a predetermined compensating value on the basis of the proper data set stored in said second storage section, a post-determination proper data set input after termination of the error determination and a number of times the error determination has been made, and wherein when the post-determination proper data set is input after the error determination is made by said collision judgment control unit at least once, said collision judgment control unit uses, in the collision judgment, a value obtained by adding the compensating value to an acceleration value represented by the post-determination proper data set.

4. A collision judging system as claimed in claim 3 wherein said compensating-value calculation section calculates the compensating value in accordance with a mathematical expression of $(B-A)N/2$, where A represents the proper data set stored in said second storage section, B represents the post-determination proper data set, and N represents the number of times the error determination has been made.

5. A collision judging system as claimed in claim 1 wherein said collision judgment control unit includes a detected data output section for outputting, as a detected acceleration data set, the latest proper data set of the plurality of the received acceleration data sets stored in said first storage section, a collision-judging-value calculation section for adding acceleration values represented by a plurality of the detected acceleration data sets output from said detected data output section and thereby outputting, as a collision judging value, a resultant sum of the acceleration values represented by the detected acceleration data sets, and a comparison section for comparing the collision judging value and a preset collision-judging threshold value.

6. A collision judging system as claimed in claim 5 wherein said collision judgment control unit includes a second storage section for storing the detected acceleration data set and wherein when said detected data output section has made an error determination that all of the plurality of the acceleration data sets stored in said first storage section are erroneous data sets, said collision-judging-value calculation section uses, as substitute data, the detected acceleration data set stored in said second storage section to calculate the collision judging value, the collision judging value being calculated by adding respective acceleration values represented by a plurality of the detected acceleration data sets including the substitute data.

7. A collision judging system as claimed in claim 6 wherein said collision-judging-value calculation section further includes a compensating-value calculation section for calculating a predetermined compensating value on the basis of the detected acceleration data set stored in said second storage section, an post-determination detected acceleration data set input after termination of the error determination and a number of times the error determination has been made, and wherein when the post-determination detected acceleration data set is input after the error determination is made by said collision judgment control unit at least once, said collision judgment control unit outputs the collision judging value calculated by adding respective acceleration values represented by a plurality of the detected acceleration data sets that include an acceleration value obtained by adding the compensating value to an acceleration value represented by the post-determination detected acceleration data set.

8. A collision judging system as claimed in claim 7 wherein said compensating-value calculation section calculates the compensating value in accordance with a mathematical expression of $(B-A)N/2$, where A represents the detected acceleration data set stored in said second storage section, B represents the post-determination detected acceleration data set, and N represents the number of times the error determination has been made.

9. A collision judging system as claimed in claim 5 wherein said reception section receives an acceleration data set from said transmission section in each predetermined reception cycle, and wherein said detected data output section outputs, as the detected acceleration data set, the latest proper data set of the plurality of the received acceleration data sets stored in said first storage section, in each operating cycle set to an integral multiple of the predetermined reception cycle.

10. A collision judging system as claimed in claim 1 wherein said sensor unit is provided on a deformable member in a front end portion of a vehicle.

* * * * *